April 30, 1935. G. C. ROYSE 1,999,640
CONVERTER PUNCHING APPARATUS
Filed June 29, 1932 5 Sheets-Sheet 1
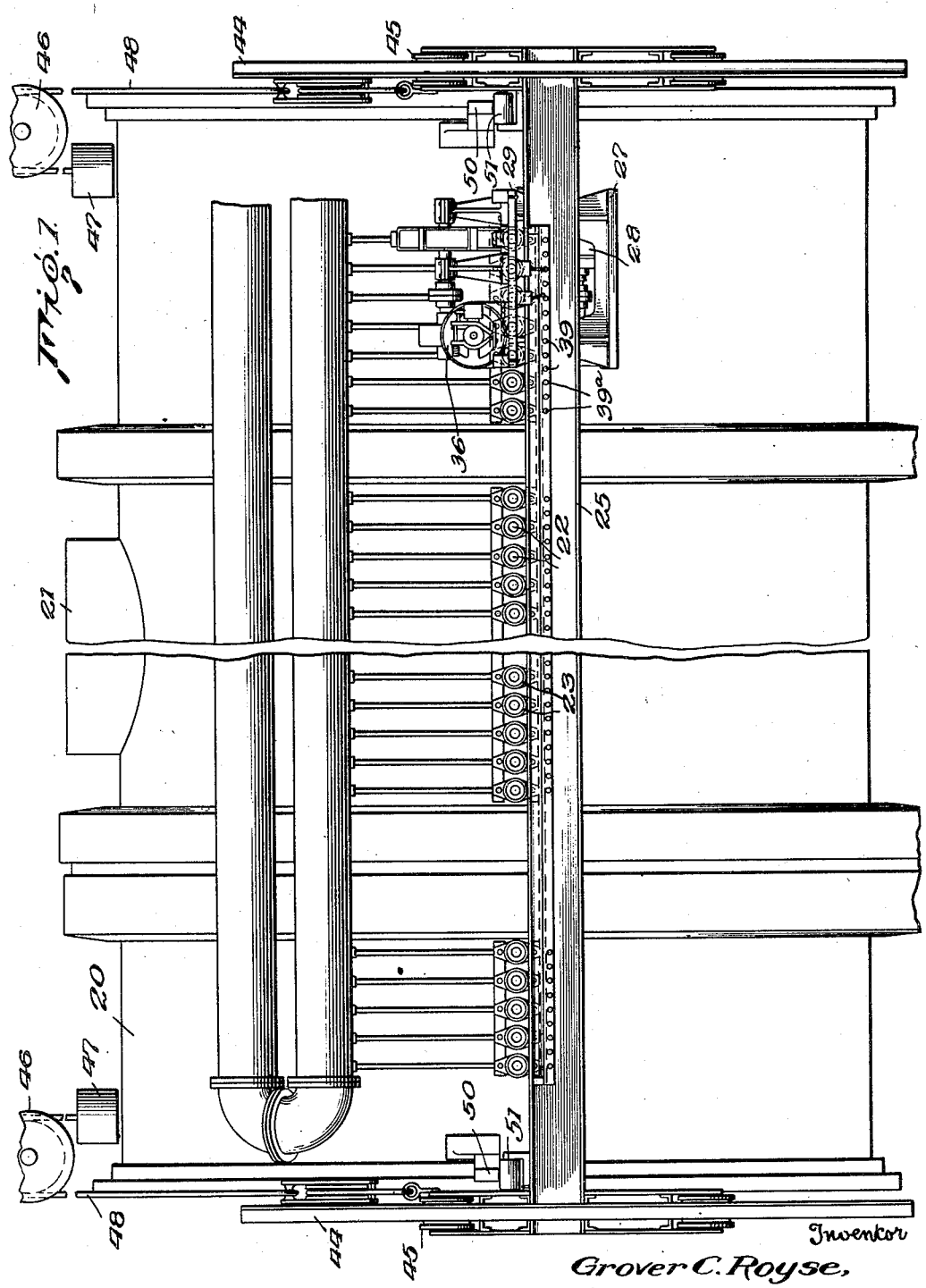
Inventor
Grover C. Royse,
By Church & Church
His Attorneys

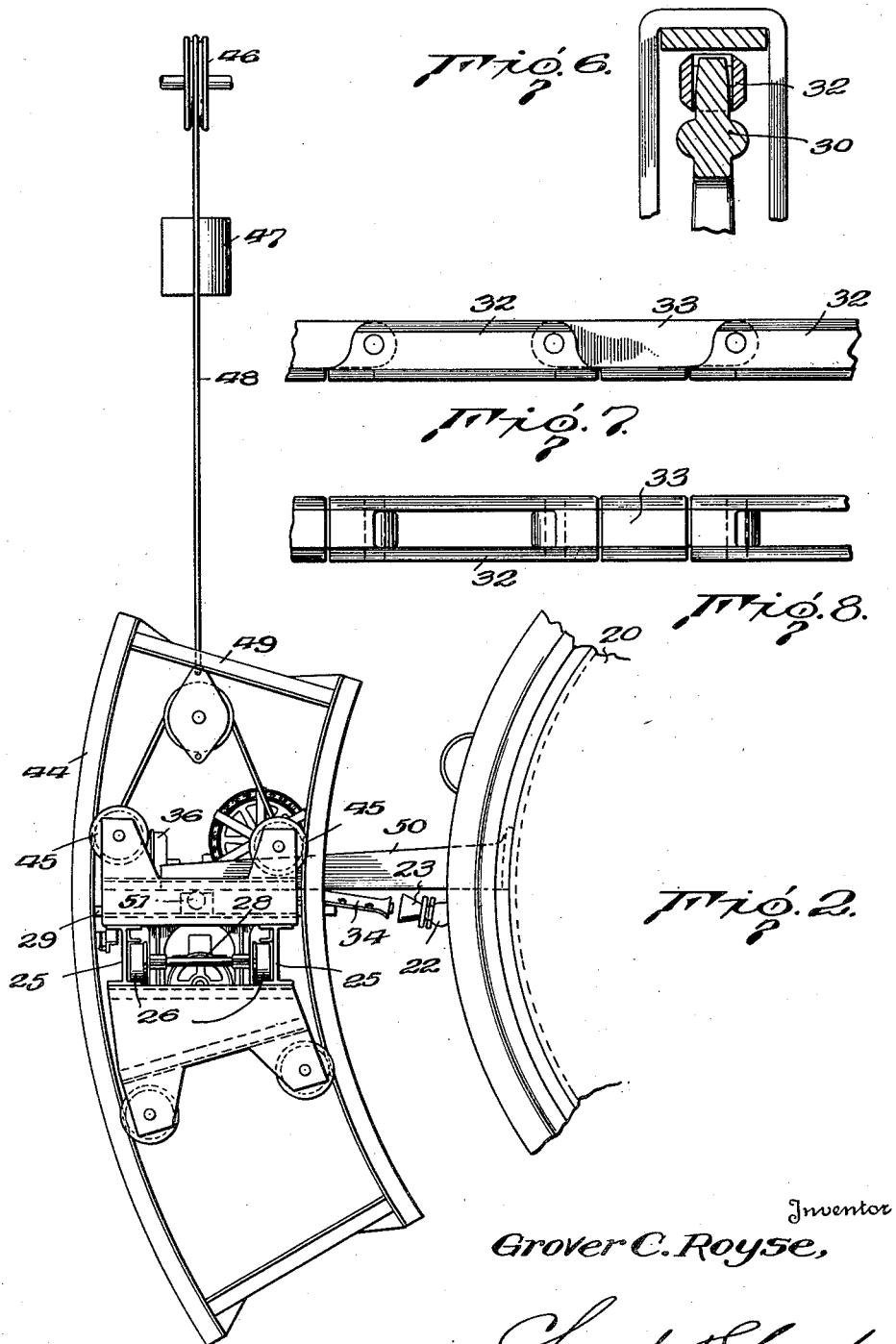

April 30, 1935.  G. C. ROYSE  1,999,640

CONVERTER PUNCHING APPARATUS

Filed June 29, 1932   5 Sheets-Sheet 3

Inventor
Grover C. Royse,

By
His Attorneys

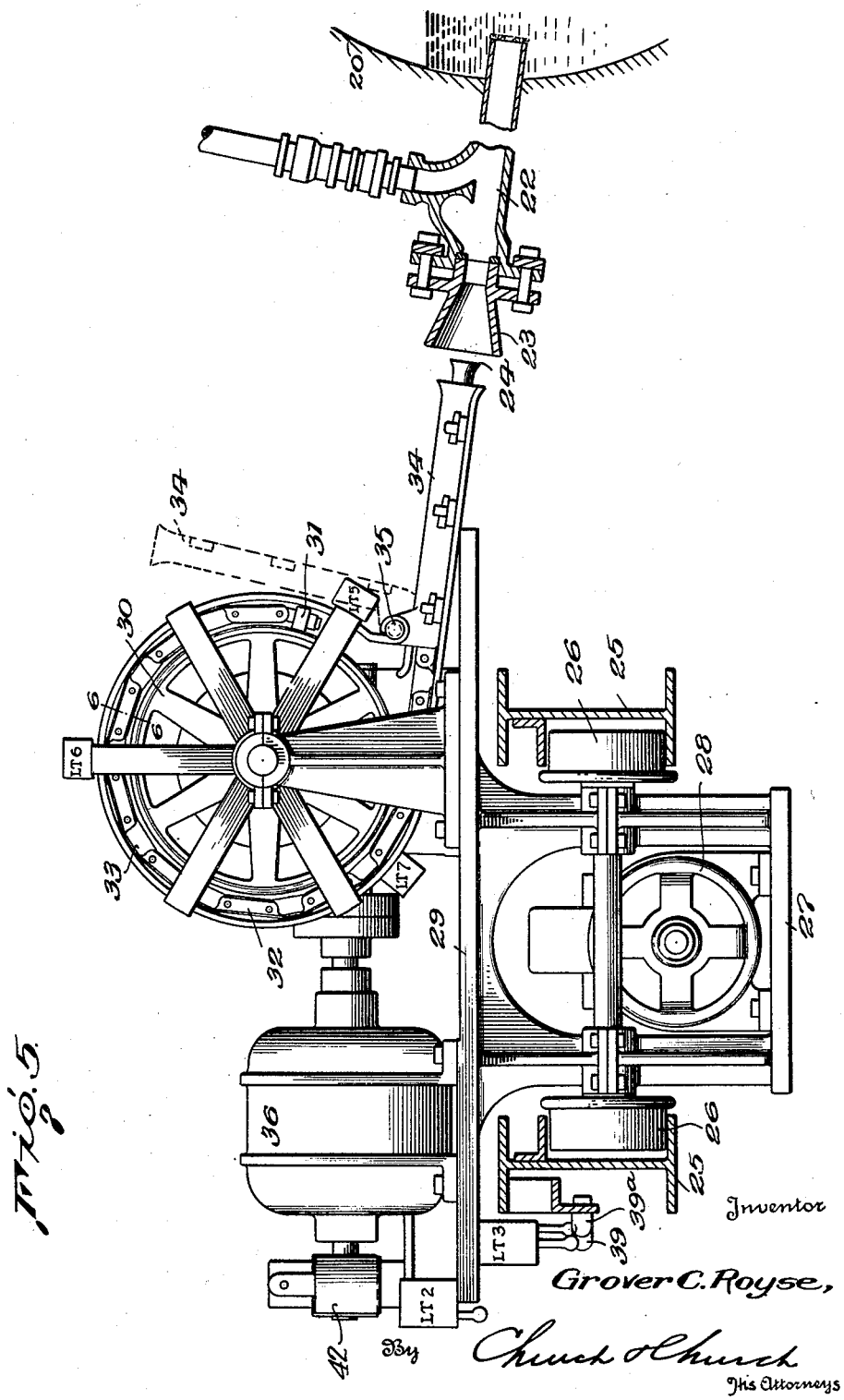

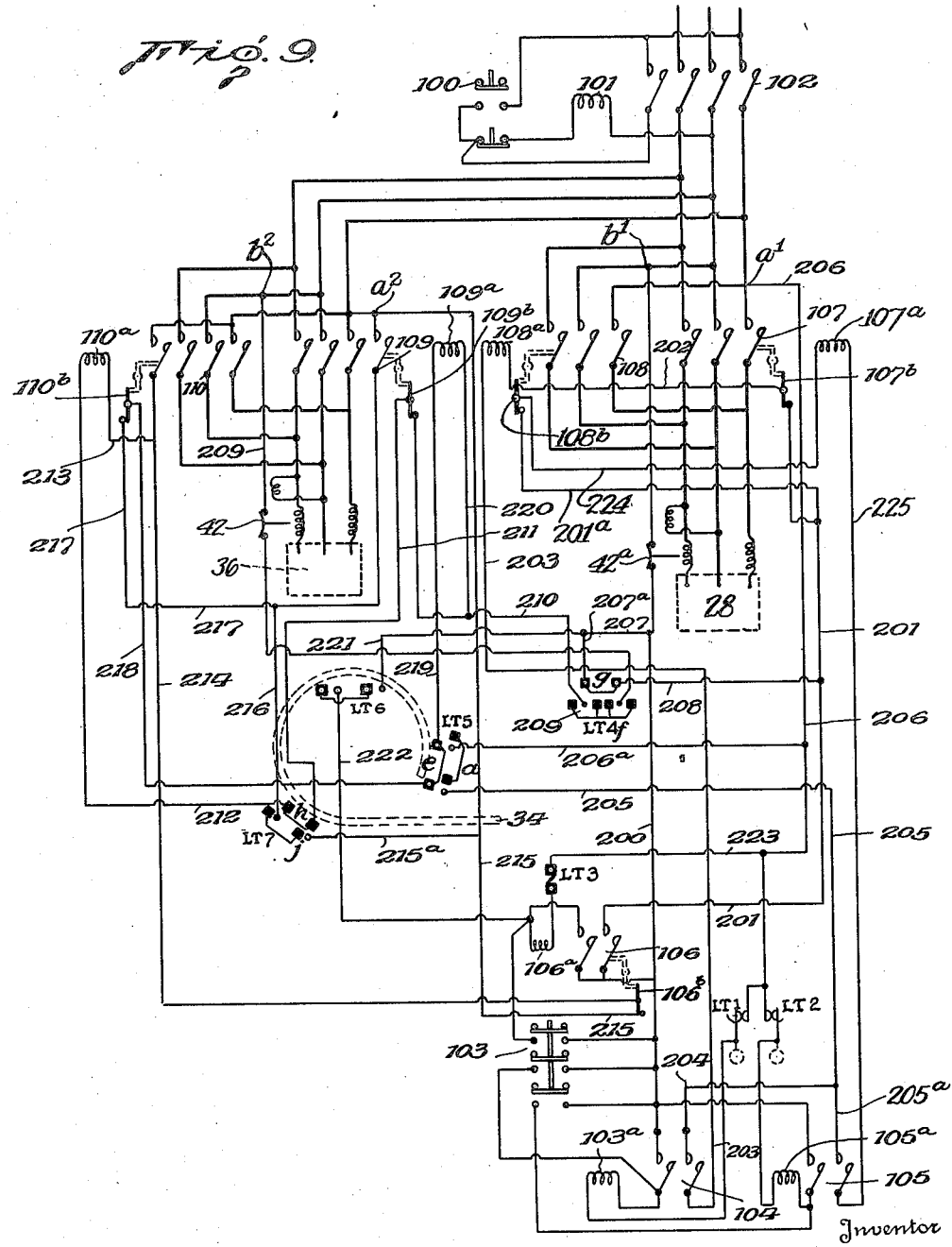

Patented Apr. 30, 1935

1,999,640

UNITED STATES PATENT OFFICE 1,999,640

CONVERTER PUNCHING APPARATUS

Grover C. Royse, Vallejo, Calif.

Application June 29, 1932, Serial No. 619,977

10 Claims. (Cl. 266—42)

This invention relates to improvements in punching apparatus for cleaning tuyères of converters commonly used in smelting.

Converters used in smelting operate to blow the impurities from the copper matte by means of compressed air, which is forced into the converter through tuyère pipes located at the rear of the converter. However, crusts of slag form on the inner ends of the tuyère pipes, and reduce the air passage, so that it becomes necessary to remove this crust periodically. It has been the practice to remove these crust formations from tuyère pipes manually, and an object of the present invention is to provide means for automatically removing the crust from the tuyères.

Another object of the invention is to arrange the tuyère cleaning instrument and its operating mechanism on a traveling carriage, and actuate said carriage and instrument in such fashion that successive tuyères may be cleaned without any manual control over the operating mechanisms.

A further object is to provide a tuyère cleaning apparatus especially applicable for use in connection with rotary converters, or that type of converter which is rotated to discharge the contents therefrom. In this connection, the invention contemplates the provision of means for automatically determining the position of the tuyère punching instrument with respect to the tuyères, circumferentially of the converter.

The apparatus also includes means for automatically positioning the punching tool or instrument in alinement with the individual tuyères, longitudinally of the converter, and, in this connection, the invention contemplates means associated with the cleaning or punching instrument for rendering operative the means that position the punching tool whereby it will be impossible for the punching tool to be moved longitudinally of the converter, until and unless, the punching tool is free of the tuyère pipes.

A still further object consists in the provision of a punching instrument detachably secured to a series of articulated members, which may yield laterally, so to speak, but which are substantially unyielding longitudinally of the cleaning tool, or longitudinally of the tuyères.

Another object consists in providing a removable housing for the cleaning tool and the articulated elements to which it is attached, whereby ready access may be had to those instrumentalities.

With these and other objects in view, the invention consists in certain details of construction and combinations and arrangements of parts, all as will hereinafter be more fully described, and the novel features thereof particularly pointed out in the appended claims.

In the accompanying drawings,

Figure 1 is a rear elevation illustrating the tuyère pipes, and the present apparatus for cleaning the same, the converter proper being shown more or less in outline;

Fig. 2 is an end elevation;

Fig. 5 is a side elevation of the mechanism illustrated in Fig. 3;

Fig. 6 is a detail sectional view on the line 6—6 of Fig. 5;

Fig. 7 is an elevational view, showing in detail the articulated members to which the punching tool, per se, is attached;

Fig. 8 is a plan view of said members;

Fig. 9 is a wiring diagram for the apparatus of Figs. 1 to 8.

Figure 4:
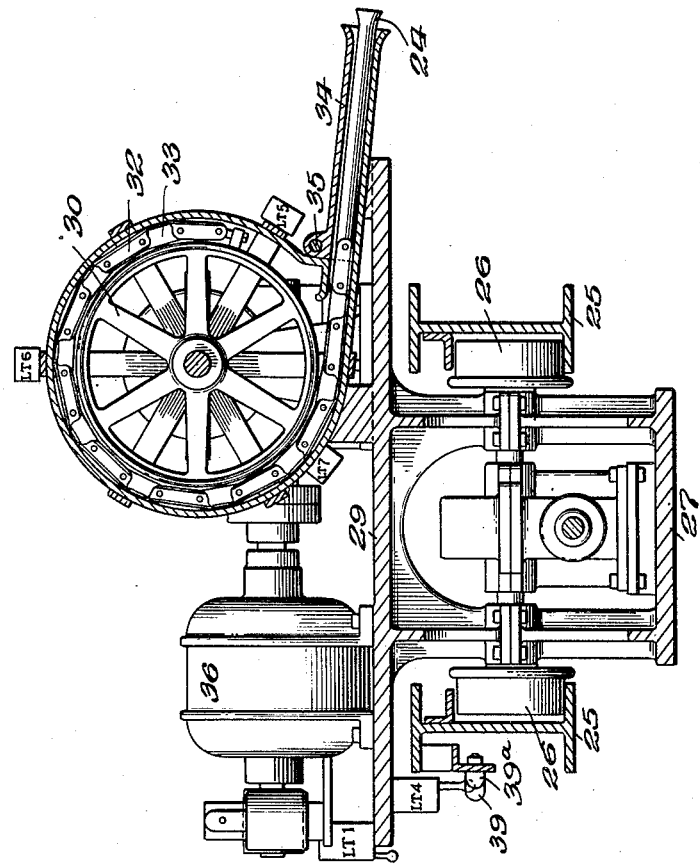
Fig. 4 is a sectional view on the line 4—4 of Fig. 3.

In the preferred embodiment of the invention illustrated in views 1 to 8, the converter 20 is shown more or less in outline, the discharge for the converter being shown at 21. The tuyère pipes 22 project radially from the converter and at their outer extremities, each pipe is provided with an enlarged casting 23, the several castings being secured in place by suitable fastening means. The tuyère pipes are arranged in a row longitudinally of the converter and the present apparatus comprises a punching tool 24 adapted to be automatically moved into registry with individual tuyère pipes and reciprocated therein for the purpose of removing therefrom any crust that is formed in said pipes, as before mentioned. These instrumentalities for manipulating the punching tool 24 are preferably supported on ways 25 that extend longitudinally of the converter. Supported on said ways, by traction wheels 26, is a carriage 27; and mounted on said carriage is a motor 28 which, through suitable drive connections, is adapted to drive said traction wheels at predetermined times or intervals, as will hereinafter be more fully described. Formed at the upper portion of said carriage is what might be termed a platform 29, and journaled above said platform is a sprocket wheel 30, on whose periphery there is a projection 31, to which is attached, at one end, a series of articulated elements, the elements of said series being indicated at 32, 33. The other end of this series of articulated elements has secured thereto punching tool 24, normally positioned within a tubular housing 34. One section of said housing is pivoted at 35, whereby the same may be raised, as shown in dotted lines in Fig. 5, for the purpose of giving access to the cleaning tool, as, for instance, when a new tool is to be substituted for an old one. Also, to facilitate replacements in the series of articulated elements, the housing for the sprocket wheel 30 is of cage-like formation, as shown in Fig. 5.

Also mounted on platform 29 is a motor 36, connected through suitable drive connections to the sprocket wheel 30, for rotating the latter, first in one direction and then in the other. Not only is motor 36 adapted to rotate alternately in opposite directions, but motor 28, for moving the carriage 27, is also adapted to have its direction of rotation reversed each time the carriage reaches the ends of the ways 25. This reversal of movement of the motors may be accomplished by the use of limit switches, which are well-known in the art.

Figure 3:
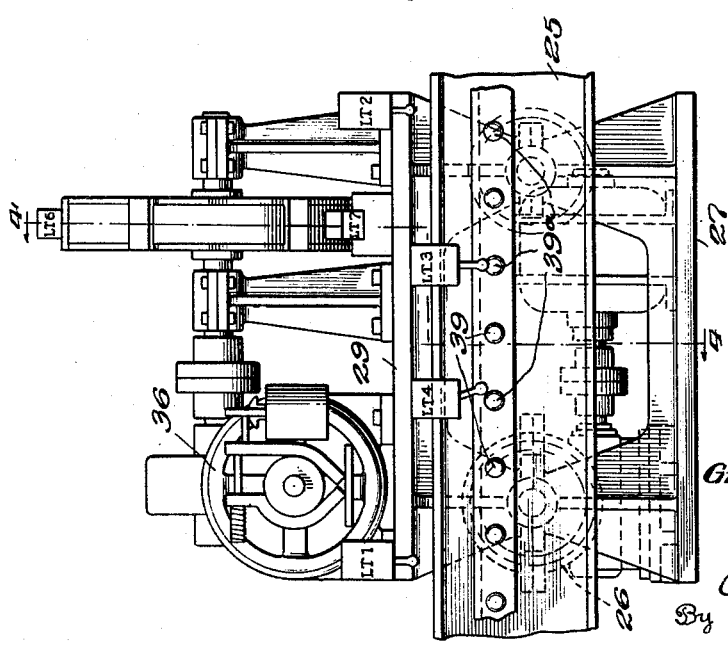
Fig. 3 is a front elevation of the mounting for the tuyère punching apparatus.

As shown in Figs. 3 and 4, limit switches LT—I and LT—2 are mounted on motor carriage 29 for the purpose of reversing the direction of rotation of carriage motor 28; limit switches LT—3 and LT—4 on motor carriage 29 are engageable by trips 39, 39a, along one of the carriage ways; and limit switches LT—5, LT—6 and LT—7, associated with the punch sprocket, jointly control the stopping and starting of the carriage motor and the starting, stopping and reversing of the punch motor 36. Referring to Fig. 9, the various circuits are completed as follows, assuming that the carriage is at the extreme limit of travel toward the right in Fig. 1. Under these conditions, limit switch LT—I will be closed and limit switch LT—2 will be open. Push button 100 is first closed, completing a circuit through holding coil 101 of contactors 102. Push button 103 is then closed, completing a circuit through holding coil 103a of contactor 104, closing said contactor 104, and limit switch LT—I. Another circuit is closed at the same time through the holding coil 106a of contactor 106, and limit switch LT—3, closing contactor 106. The closing of contactors 104 and 106 also completes a third circuit from b—I, through line 200 to contactor 106; line 201 to auxiliary switch 107b of contactor 107; line 202 through holding coil 108a of contactor 108; through line 203; through contactor 104 and lines 204, 205; through the d side of limit switch LT—5 and from said limit switch to point a—I by lines 206, 206a. This circuit effects the closing of contactor 108 and renders carriage motor 28 operative to move the carriage to the left as viewed in Fig. 1. Before the carriage reaches the first tuyère or its first punching station, so to speak, limit switch LT—3 engages one of trips 39 and is opened. This, in turn, opens contactor 106. Contactor 108, however, remains closed by means of a circuit through LT—4, this circuit being as follows: From line 200 and lines 207, 207a, through the g side of LT—4, lines 208, 201, auxiliary switch 107b, line 202; holding coil 108a; line 203; contactor 104; lines 204, 205; d side of LT—5 and lines 206a, 206 to a—I. However, when the punching tool has reached a point in registry with the first tuyère to be punched, limit switch LT—4 strikes one of the trips 39a, opening the circuit through the g side of said switch and the holding coil of contactor 108 so that said contactor opens and stops the carriage motor.

With the limit switch LT—4 against the trip 39a, the f side of said switch is closed, completing a circuit from b—2 through line 209 and the f side of limit switch LT—4; then through line 210, auxiliary switch 109b of contactor 109 and line 211 to limit switch LT—7; through the h side of said limit switch and line 212 to the holding coil 110a of contactor 110; from said coil by lines 213, 214 to the auxiliary switch 106b of contactor 106 and then by line 215 to the point a—2. The closing of this circuit actuates contactor 110 to close the circuit for the punching tool motor. Said motor effects the projection of said tool into the tuyère until limit switch LT—7 is engaged by a stop 38 on the punching tool sprocket, whereupon the h side of said switch is opened and the punching tool motor rendered inoperative.

At the time the h side of limit switch LT—7 is opened by stop 38, the j side of said switch is closed, completing a circuit through the holding coil 109a of contactor 109. This circuit is as follows: From point a—2 by line 215 and line 215a through the j side of limit switch LT—7; lines 216, 217 through auxiliary switch 110b of contactor 110; line 218 through the e side of limit switch LT—5 and line 219 through holding coil 109a; lines 220 and 210 through the f side of limit switch LT—4 and by line 209 to point b—2. This closes contactor 109 and reverses the punching tool motor to withdraw the tool from the tuyère.

During the retractive movement of the tool, limit switch LT—6 is engaged by stop 38 and closes a circuit from b—I through the holding coil of contactor 106 to a—I. This circuit is as follows: From b—I by lines 200, 207, 221, through limit switch LT—6; by line 222 through holding coil 106a and limit switch LT—3 and lines 223 and 206 to a—I. This closes contactor 106 so that when the punching tool has been fully retracted and limit switch LT—5 is engaged by stop 38, to open the e side thereof, to stop the punching tool motor, the d side of said switch is closed, completing the following circuit: From a—I by line 206, through the d side of limit switch LT—5; by lines 205, 204, through contactor 104; by line 203 through holding coil 108a and line 202, through auxiliary switch 107b; line 201, contactor 106 and line 200 to b—I. This again closes contactor 108 and starts the carriage motor to move the punching tool. Before the tool has arrived at a point in registry with the next tuyère to be punched, usually about midway between tuyères, limit switch LT—3 strikes another trip 39, opening contactor 106, contactor 108 remaining closed until LT—4 engages the next trip 39a for closing the circuit through the punching motor as before described. The cycle of operations is then repeated. This repetition is continued until the carriage has moved to the extreme left of Fig. 1, whereupon limit switch LT—I is opened, opening contactor 104 and both motors remain inactive until the attendant again closes push button 103.

When the push button 103 is again closed, the operations will be the same as just described, except that limit switch LT—I being open and limit switch LT—2 being closed, contactors 105, 107, instead of contactors 104, 108, will be closed.

That is, the carriage motor circuit from b—I to a—I, instead of being as before described, will be as follows: From b—I, line 200; through contactor 106; line 201; line 201a, auxiliary switch 108b of contactor 108; line 224; holding coil 107a, line 225, contactor 105; lines 205a, 205; d side of LT—5 and line 206 to a—1. By thus closing contactor 107, the direction of rotation of the motor carriage will be reversed, and the carriage moved past the tuyères from left to right, as viewed in Fig. 1.

With the apparatus thus described, and with the understanding that the punching tool motor 36 turns a given number of revolutions in one direction, which will turn the sprocket wheel about three-quarters of a revolution, it will be seen that, as the punching tool is moved into a tuyère pipe, the crust will be removed therefrom. The punching motor then turns the same number of revolutions in the reverse direction and the punching tool is withdrawn from the tuyère pipe to its original position, as shown in Fig. 4, at which point the punching tool motor will be suddenly stopped by an electro-magnetic brake 42 (Figs. 5 and 9). At this point, contact 38 will be in engagement with limit switch LT—5, to energize carriage motor 28, whereupon carriage 27 will be moved along the ways 25 until limit switch LT—4 engages the next contact 39a, whereupon an electro-magnetic brake 42a (indicated diagrammatically in Fig. 9 and of the same type as brake 42) will stop motor 28 and arrest movement of the carriage, so that the punching tool 24 may again be actuated to clean out the tuyère pipe with which it is then alined. This procedure is carried on until all the tuyère pipes are punched, or until the carriage reaches the end of the ways 25, whereupon the direction of rotation of motor 28 is reversed and the carriage rotated in the reverse direction along the ways 25.

The mechanism thus far described is adapted for use with non-rotatable converters, but where the apparatus is to be used in connection with rotary converters, the ways 25 are movably mounted in frames 44, at opposite ends of the converter, as shown in Figs. 1 and 2. The ways 25 are provided at each end with rollers 45, movable along the frames 44, the ways being supported in said frames by suspension apparatus consisting of cables 48, extending over pulleys 46 and having attached to their ends counter-balanced weights 47. Weights 47 are capable of raising the ways in the frames 44 until the upper rollers 45 engage the cross bars 49 in said frames. However, to prevent this abnormal upward movement of the ways, the converter is provided at each end with an arm 50 projecting radially therefrom, to a point where it will engage comparatively small rollers 51, mounted at the ends of the ways 25. As illustrated in Fig. 2, the ways formed in the frames 44 are substantially concentric with the periphery of the converter, and when the converter is rotated to discharge its contents, upward movement of arms 50 will permit the ways 25 to ride upward in the frame 44 until the upper rollers 45 engage the cross bar 49. The ways will be held at this point, although the arms 50 move on out of contact with the rollers 51, until the discharge opening 21 has reached a point where the contents of the converter will be discharged. When the converter is returned to its normal position, arms 50 will again engage the rollers 51 and depress the ways 25 in the frame 44. In this way, alinement of the punching tool with the tuyère pipes, circumferentially of the converter, is optionally assured. In other words, the present invention provides means not only for positioning the punching tool in registry with the tuyère pipes longitudinally of the converter, but, in connection with rotary converters, means are also provided for positioning the punching tool in registry with the tuyère pipes circumferentially of the converter.

What I claim is:

1. In an apparatus for punching converter tuyères, the combination of a punching tool comprising articulated elements, said tool being unyielding longitudinally of the tuyères, means for moving said tool into and out of registry with the individual tuyères, actuation of said last mentioned means being controlled by movement of the punching tool, and means for reciprocating said tool in said tuyères.

2. In an apparatus for punching converter tuyères, the combination of a punching tool, electrically operated means for reciprocating said tool in the individual tuyères and electrically operated mechanism for moving said tool into and out of registry with the tuyères longitudinally of the converter, the operation of said last mentioned mechanism being controlled by the reciprocatory movement of the tool.

3. In an apparatus for punching tuyères of a rotary converter, the combination of a carriage frame, a carriage movable on said frame longitudinally of the converter, said frame and carriage being movable as a unit circumferentially of the converter, a punching tool on said carriage and means for reciprocating said tool in the individual tuyères.

4. In an apparatus for punching converter tuyères, the combination of a rotatable support, a series of articulated members on said support, a punching tool attached to said articulated members, a carriage on which said support is mounted, motor-driven means for moving said carriage longitudinally of the converter, means for automatically controlling the operation of said motor, and means for revolving said rotary support for reciprocating said tool in the converter tuyères.

5. In an apparatus for punching converter tuyères, the combination of a rotary support, a plurality of articulated members on said support, a punching tool attached to said articulated members, means for revolving said support to reciprocate the tool in the converter tuyères, a carriage on which said support is mounted, motor-driven means for moving said carriage longitudinally of the converter, means associated with said articulated elements for rendering said motor operative, and means on said carriage for rendering said motor inoperative, whereby said carriage will be moved to position said punching tool in registry with the individual tuyères.

6. In an apparatus for punching converter tuyères, the combination of a rotary support, a series of articulated elements on said support, a punching tool attached to one end of said articulated members, and a casing for said tool, a portion of said casing being removable to give access to said tool.

7. In an apparatus for punching converter tuyères, the combination of ways extending longitudinally of the converter, a carriage movable longitudinally of said ways, a motor for moving said carriage, a punching tool on said carriage, means associated with said punching tool for closing the circuit of said motor when the tool is withdrawn from the tuyère, and means associated with said ways for opening said circuit when said tool is positioned in registry with one of said tuyères.

8. In an apparatus for punching tuyères of a rotary converter, the combination of a carriage movable longitudinally and circumferentially of the converter, a punching tool on said carriage, means for reciprocating said tool in the individual tuyères, and means for alining said punching tool with the individual tuyères.

9. In an apparatus for punching tuyères of rotary converters, the combination of a carriage movable longitudinally and circumferentially of the converter, a punching tool on said carriage and means controlling the longitudinal movement of said carriage to position said tool in registry with the individual tuyères, means carried by the converter for effecting registration of said punching tool with the tuyères circumferentially of the converter and means for reciprocating said tool in the tuyères.

10. In an apparatus for punching tuyères of a converter, the combination of a rotatable support, a series of articulated rigid members, an elongated rigid punching element detachably secured to said articulated elements, means for moving said support longitudinally of the converter to position said punching element in registry with the individual tuyères, and means for revolving said rotary support to reciprocate said punching element in the individual tuyères.

GROVER C. ROYSE.